United States Patent [19]
Castonguay et al.

[11] Patent Number: 4,816,511
[45] Date of Patent: Mar. 28, 1989

[54] CEMENT FOR CATHODE BLOCKS

[75] Inventors: Lise Castonguay, Chicoutimi; Sadashiv Nadkarni; Mukesh Jain, both of Jonquiere, all of Canada

[73] Assignee: Alcan International Limited, Montreal, Canada

[21] Appl. No.: 171,692

[22] Filed: Mar. 22, 1988

[30] Foreign Application Priority Data

Mar. 23, 1987 [CA] Canada ................................. 532773

[51] Int. Cl.$^4$ ............................................... C08K 3/04
[52] U.S. Cl. ..................................... 524/496; 524/906; 252/511
[58] Field of Search .......................... 524/496; 252/511

[56] References Cited

U.S. PATENT DOCUMENTS 3,969,124  7/1976  Stewart ................................. 524/496

FOREIGN PATENT DOCUMENTS 0664493  6/1963  Canada ................................. 524/496
0683872  4/1964  Canada ................................. 524/496
58-098378 6/1983  Japan .................................. 524/496

Primary Examiner—Lewis T. Jacobs
Attorney, Agent, or Firm—Cooper & Dunham

[57] ABSTRACT

A cement for bonding carbon blocks, particularly the cathode blocks of electrolytic cells, e.g. Hall-Heroult cells used for the production of aluminum. The cement comprises a carbonaceous aggregate of particle size smaller than 48 Tyler mesh, a curable water-soluble liquid polymeric resin (preferably a phenol-formaldehyde resin), water and normally a curing agent for the resin. The water is used in such an amount that the proportion of the resin can be reduced without adversely affecting the viscosity of the cement at ambient temperature. The cement carbonizes when the carbon blocks are subjected to high temperatures and has a linear shrinkage of less than 5%, which reduces the tendency of the carbonized cement to crack.

14 Claims, No Drawings

CEMENT FOR CATHODE BLOCKS

BACKGROUND OF THE INVENTION

I. Field of the Invention

This invention relates to cements used for bonding carbon blocks. More particularly, the invention relates to cements suitable for bonding carbon blocks used to form the cathodes of electrolytic reduction cells, as well as carbon blocks used for similar high temperature applications.

II. Description of the Prior Art

Aluminum is conventionally produced by the reduction of alumina in a "Hall-Heroult" electrolytic cell provided with a lining made of prebaked carbon blocks. The lining acts as a refractory material to protect the cell walls and bottom from the hot molten electrolyte and aluminium, and as a cathode for the electrolysis process. To form the cell lining, the prebaked carbon blocks are fitted together as closely as possible and the inevitable gaps present at the block joints are filled with a material which carbonizes at the operational temperatures of the cell so that a monolithic carbon lining is formed.

Any cracks which form in the carbon lining reduce the operational lifetime of the cell since the hot electrolyte or aluminum may then penetrate the protective lining. It is consequently important to use a material in the cathode block joints which has good resistance to cracking and shrinkage.

Hot tamping mixes have conventionally been used for filling cathode block joints. Such mixes normally consist of a carbonaceous aggregate, e.g. calcined anthracite, and a binder, e.g. pitch or a tar-pitch mixture. Hot tamping mixes achieve good results but they expose workers to unpleasant tar fumes and to noise generated by tamping tools. To overcome the problem of fume generation, various formulations which can be used at room temperature to fill cathode block joints have been developed. These formulations are of two distinctly different types, namely room temperature tamping mixes and room temperature cements (sometimes also referred to as "glues"). Room temperature tamping mixes are usually formed by adding a viscosity-reducing solvent to hot tamping mix formulations, but their room temperature viscosities remain fairly high (e.g. about 5 poise) and so tamping tools are required to pack the mixes into previously-formed cathode block joints. Consequently, the workers are still exposed to the noise of tamping tools when such formulations are used. In contrast, room temperature cements, which generally consist of a carbonaceous aggregate and a resin-based binder, have fairly low room temperature viscosities and may be spread with trowels or the like onto the cathode blocks before the joints are formed. Clearly, therefore, cements are preferred from the environmental point of view.

However, the inventors of the present invention have found that commercially-available room temperature cements are not satisfactory because they shrink and crack unacceptably when used in electrolytic cells. This may be because the commercial mixes were developed for joint thicknesses of about 1 mm, which are not unusual when graphite blocks are employed, whereas joint thicknesses of up to 3 mm are more usual when amorphous carbon blocks are employed because the machining costs of such blocks increase unacceptably when strict tolerances are imposed. The use of amorphous carbon blocks is common in electrolytic cells used for the production of aluminum, so there is a need for a room temperature cement which can fill joints up to about 3 mm (e.g. 2-3 mm) in width without cracking when exposed to cell-operating conditions.

It is believed that previous attempts to produce suitable cements concentrated on maximizing the density of the cured product to give a joint of high strength and low porosity, but such mixes result in high shrinkage. The inventors have found that cracking takes place if the linear shrinkage of the cement exceeds about 5% when the green cement is first subjected to cell-operating temperatures (e.g. about 900°-1000° C.) which cause the binder to carbonize. A small amount of shrinkage is permissible, indeed desirable, because adjacent carbon blocks expand when heated and so reduce the joint width, but linear shrinkages of more than about 5% exceed the reduction of the joint width and introduce the potential for lining failure. However, the inventors also found that it was not an easy matter to produce a room temperature cement having a linear shrinkage of less than 5%. If the particle size of the aggregate is reduced for this purpose, the binder content has to be increased in order to maintain adequate viscosity for application with a trowel at room temperature, but increased amounts of binder result in higher shrinkage rates.

There is accordingly a need for a cathode block cement which is sufficiently fluid for use at ambient temperature and which has a linear shrinkage of less than about 5% when exposed to cell operating conditions as well as having the other necessary characteristics of a cathode block cement, e.g. a suitable carbon yield and density.

SUMMARY OF THE INVENTION

The invention provides a cement for bonding carbon blocks, and particularly for bonding cathode blocks used in electrolytic cells. The cement comprises an aggregate selected from the group consisting of calcined anthracite, graphite and mixtures thereof, the aggregate having a particle size of smaller than 48 Tyler mesh; and a binder comprising 10-35% by weight based on the total weight of the cement of a curable water-soluble liquid polymeric resin, and 10-35% by weight based on the total weight of the cement of water. The total weight of the binder falls within the range of 40-50% by weight based on the total weight of the cement.

The water used in the cement may be partially or completely replaced by a solvent or diluent for the resin having the following characteristics.

The solvent or diluent should be substantially nonreactive with the resin, have a boiling point at atmospheric pressure of about 150° C. or below and be capable of preventing the evolution of volatiles from the resin upon curing at a rate which causes undue porosity of the cement.

Reference is made throughout this specification to "room" or "ambient" temperature. Both these terms mean the temperatures normally encountered in the locations where the cements are used prior to cell operation, e.g. 10°-35° C., more usually 5°-25° C. and optimally about 25° C.

By the term "water-soluble liquid polymeric resin" we mean any resin which is liquid at ambient temperature and which has a solubility in water at ambient temperature of at least about 1% by weight (i.e. at least about 1 g of resin will dissolve in 100 g of water). In the cement formulation of the invention, the ratio of resin to water may be such that not all of the resin dissolves. This is acceptable provided the undissolved portion of the resin is water-miscible, i.e. able to form a colloidal suspension with the water consisting of a discontinuous phase evenly dispersed in a continuous phase. The resin should also be capable of solidifying by crosslinking or further polymerization at room temperature or a higher temperature. Liquid resins which require the presence of a curing agent in order to bring about the solidification may be employed, in which case the binder should additionally contain a catalytically-effective amount of a non-latent (room temperature) or latent (elevated temperature) curing agent.

DETAILED DESCRIPTION OF THE INVENTION

The cement of the invention has a suitably low linear shrinkage rate (about 5% or less) when subjected to carbonization, while also exhibiting a suitably low room temperature viscosity. This is believed to be due to the fact that the presence of the water maintains the required low viscosity of the cement at room temperature while permitting both the particle size of the carbonaceous aggregate and the resin content to be kept low in order to reduce linear shrinkage. The water makes no contribution to the coking value of the binder and hence does not add to shrinkage of the cement during carbonization. Instead, the low boiling point an non-reactivity of the water means that it escapes from the cement before carbonization takes place, either by evaporation or by soaking into the porous carbon blocks, or both, usually leaving scattered porosity (i.e. small, evenly-spaced pores) throughout the cement. Contrary to previous belief that porosity in the cement was to be avoided, the scattered porosity produced by the water does not weaken the cement after carbonization, nor does it permit undue penetration of the cell contents into the cathode block joints.

As will be apparent later, tests have shown that certain low boiling organic solvents are not effective as replacements for the water in the cement formulations of the invention and it consequently appears that the water may not act merely as a viscosity-reducing agent for the cement in the manner stated above. Without wishing to be bound to any particular theory, the inventors believe that the water may be effective for the following reason. When certain prior art cements were cured, a "frothing" of the cement in the block joint was observed which substantially expanded and weakened the cement and produced a very porous product. These cements contained phenolic resins which release volatiles, primarily water vapour, as they polymerize and cross-link and it is believed that an accelerated release of the volatiles causes the frothing. The presence of water in the binder may serve to reduce the rate of release of the volatiles by two separate mechanisms. Firstly, the water replaces some of the resin and thus reduces the concentration of the resin and decelerates the curing process. Secondly, the presence of the water may shift the equilibrium of the curing reaction in the reverse direction and hence further decelerate the curing step. This latter mechanism would explain why water is effective whereas certain other solvents are not.

When the content of the resin exceeds 35% by wt. of the cement, the shrinkage of the resin upon carbonization becomes unacceptably high. Less than 10% by wt. of the resin is too little to provide an adequate binder for the aggregate. When more than 35% by weight of water is present, the porosity of the carbonized cement becomes too high. When less than 10% by weight is present, the room temperature viscosity of the cement is too high. The range of 40-50% by weight for the binder (resin plus water) imparts a suitable room temperature viscosity to the cement while limiting shrinkage on carbonization.

The liquid polymeric resin preferably has a high coking value, e.g. greater than 35% by weight, and is one which is soluble in water at room temperature and is also curable at ambient or elevated temperature. Resole and novolak resins may be employed and phenol-formaldehyde type resins having a low viscosity at ambient temperature and a high carbon yield are preferred. Suitable resins can be obtained from the Bordon Chemical Company and from the Bakelite Company. A latent or non-latent curing agent may be used, if required, depending on the resin employed. Novolak resins always require the presence of a curing agent.

The viscosity of the binder (resin plus water) is preferably kept below 200 cps at 25° C.

The aggregate preferably has a particle size distribution (granulometry) in which 20–100% of the particles have a size smaller than 200 Tyler mesh with the remainder (if any) within the range of minus 48 to plus 200 Tyler mesh.

When anthracite is employed in the aggregate it is calcined prior to use, preferably at a temperature of 1600° C.–1800° C. The calcination has the following effects:

(a) it eliminates the volatiles contained in the green anthracite;

(b) it reduces swelling due to sodium absorption; and (c) it eliminates shrinkage of the anthracite when subjected to high temperatures.

The curing agent, if used, may be of the non-latent (i.e. ambient temperature) type or the latent (i.e. elevated temperature) type and should be present in a catalytically-effective amount, normally up to 5% by weight of the weight of the binder. When phenol-formaldehyde is used as the resin, examples of the curing agent are phosphonic acid, toluene sulphonic acid and benzene-sulphonic acid.

The cement is preferably prepared as follows. Firstly, the curing agent, if used, is dissolved in a part of the water and the resulting solution is mixed with the aggregate. The remainder of the water is mixed with the resin and the resulting solution is added to the aggregate mixture and mixing is continued for a few minutes (e.g. 2–5 minutes). The cement can then be applied to the surfaces of the cathode blocks at ambient temperature using a trowel or similar implement to form filled joints having a thickness of 1–3 mm. The cement sets at ambient temperature (when a non-latent curing agent is employed) and full strength is normally developed within 24–48 hours. The cement undergoes carbonization during start-up of the cell but by that time the water has substantially dispersed by evaporation and/or absorption by the cathode blocks.

The cements of the invention may be sold in pre-mixed form, but it is more likely that the various ingredients will be packaged separately for mixture by the customer immediately prior to use. Moreover, since water is likely to be readily available at the point of use of the cement, the product may be sold in the form of a "kit" containing all the ingredients except for water together with instructions regarding how much water to add and how to mix the ingredients. Such a kit could contain the following ingredients in separate packages or compartments:
a. the graphite/anthracite aggregate
b. the liquid resin (excluding water)
c. optionally the curing agent The relative proportions of these ingredients would be those required by the invention, and a further optional element of the kit would be a mixer (e.g. a common dough mixer) to enable the cement to be produced in a convenient manner by the purchasor.

While the cements of the invention have been developed specifically for bonding cathode blocks, they may of course be used in other high temperature, non-oxidizing environments where low shrinkage is required, e.g. in preparing refractory linings of electric arc furnaces used for the preparation of steel.

Presently preferred embodiments of the invention are illustrated by the following Examples. In the Examples, percentages are by weight unless otherwise stated. The phenol-formaldehyde resins used in the Examples had viscosities of 100–200 cps at 25° C., coking values of 35–40%, and were water-soluble.

EXAMPLE 1

An aggregate consisting of graphite powder was employed. The aggregate size distribution was 100% of minus 65 mesh with 20% of a minus 200 Tyler mesh fraction. A cement was formed by mixing the aggregate with a binder. The binder content of the cement was 44.9% i.e. 13.2% of a liquid phenol formaldehyde resin soluble in water and 31.7% of water. Solid toluene sulphonic acid (2.2%) was used as a non-latent curing agent.

The cement was formed in the following manner. The toluene sulfonic acid was dissolved in 40% of the total amount of water to be used in the binder. This solution was mixed with the aggregate for 2 minutes at room temperature. The resin and the remainder of the water were added and mixing was continued for 5 minutes. The linear shrinkage of the cement on baking from 25° C. to 970° C. was 1.81%. Other properties were as follows:
Green apparent density = 0.953 g/cm³
Baked apparent density = 0.939 g/cm³

EXAMPLE 2

An aggregate of electrically-calcined anthracite was prepared with a particle size distribution of 100% of minus 200 mesh. The cement was formed using 45.9% of a binder i.e., 33.2% of a water-soluble liquid phenol formaldehyde resin and 12.7% of water. Solid toluene sulforic acid (2.2%) was used as a non-latent curing agent. The catalyst was dissolved in 18% of the total amount of water to be used in the binder. This solution was premixed with the aggregate at room temperature for 2 minutes. The remainder of the binder was added and mixing was continued for another 5 minutes. The linear shrinkage of the cement on baking from 25° C. to 970° C. was 4.40%. Other properties were as follows:
Green cement: Apparent density = 1.28 g/cm³
Baked cement: Apparent density = 1.03 g/cm³
Electrical resistivity = 101 μΩm
Compressive strength = 23.8 MPa Cathode blocks were jointed with a 2 mm thick layer of the cement. Adhesion of the block was maintained after drying of the cement and baking at 500° C. The resistance of the joint to electrolyte penetration was excellent.

EXAMPLE 3

A graphite aggregate having a particle size distribution of 100% of minus 48 Tyler mesh and 20% of minus 200 Tyler mesh was prepared. A cement was formed from the aggregate and 44.9% of a binder consisting of 31.7% water and 13.2% of a water soluble phenol formaldehyde resin. It also contained 2.2% of toluene sulfonic acid added as a non-latent curing agent.

The toluene sulfonic acid was dissolved in about 20% of the total amount of water to be used in the binder. This solution was mixed with the aggregate for 2 minutes at room temperature. Mixing was continued for 5 minutes after the addition of the remainder of the binder. The linear shrinkage of the mix on baking from 25° C. to 970° C. was 2.09%. The baked apparent density of the cement was 0.916 g/cm3

COMPARATIVE EXAMPLE 1

The following test was carried out using a commercially available cement. The cement consisted of two components: a liquid component and a solid aggregate having the following granulometry:
8% minus 48 to plus 65 Tyler mesh
27% minus 65 to plus 100 Tyler mesh
58% minus 100 to plus 200 Tyler mesh
70% minus 200 Tyler mesh.

The recommended ratio of the two was 36:100 (liquid:-solid). The solvent in this case was a mixture of furfural, furfuryl alcohol, etc. Electrodes were formed with the cement and were cured for 4 hours at 100° C., then for 16 hours at 125° C. and baked at 970° C. The properties of the baked electrodes were as follows:
Green density = 1.47 g/cm³
Baked density = 1.24 g/cm³
Dimensional changes :
dia: −8.59%
length: −2.62%

The linear shrinkage of the cement exceeded 7% and hence could not be monitored with the available instrument. The baked density of these electrodes is higher compared with the baked density of around 1.00 g/cm³ for the electrodes of the present invention. However, the shrinkage is more than doubled.

COMPARATIVE EXAMPLE 2

Another commercially available cathode block cement, in which the formulation was not in accordance with the present invention, was formed.

The solid component of the commercially available cement was mixed with the liquid component in the proportion of 2:3 (binder content 60%). The granulometry of the solid component was as follows:
26 % plus 48 Tyler mesh
8.5% minus 48 to plus 65 Tyler mesh
34.5% minus 65 to plus 100 Tyler mesh
22 % minus 100 to plus 200 Tyler mesh
9 % minus 200 Tyler mesh.

An electrode was formed but it cracked completely on baking due to excessive shrinkage, thus making it impossible to monitor any properties.

COMPARATIVE EXAMPLE 3

The procedure of Example 2 was repeated except that ethanol was used instead of water. The resulting test electrodes were moulded and subjected to accelerated curing at a temperature of 110° C. Significant expansion of the electrodes occurred during curing which resulted in high porosity in the cured electrodes which was unsatisfactory.

The procedure was repeated except that it was attempted to cure the electrodes at room temperature. Whereas electrodes made according to the invention incorporating water were fully cured after 24 hours, those incorporating ethanol did not cure at all at room temperature even after many days.

COMPARATIVE EXAMPLE 4

Both procedures of Comparative Example 3 were repeated using dimethyl formamide (DMF) instead of the ethanol and the same unsatisfactory results were observed.

These results show that these low boiling organic solvents, i.e. ethanol and DMF, cannot be used to replace the water in the present invention.

What we claim is:

1. A cement for bonding carbon blocks, which comprises:
   an aggregate selected from the group consisting of calcined anthracite, graphite and mixtures thereof, said aggregate having a particle size of smaller than 48 Tyler mesh; and
   a binder comprising 10–35% by weight based on the total weight of the cement of a curable water-soluble liquid polymeric resin, and 10–35% by weight based on the total weight of the cement of water;
   wherein the total weight of the binder falls within the range of 40–50% by weight based on the total weight of the cement.

2. A cement according to claim 1, suitable for bonding cathode blocks of an electrolytic cell, having a linear shrinkage of about 5% or less.

3. A cement according to claim 1 wherein the resin is a liquid resole resin.

4. A cement according to claim 1 wherein the resin is a liquid phenol-formaldehyde resin.

5. A cement according to claim 1, wherein the resin is a liquid novolak resin and the cement contains a catalytically-effective amount of a curing agent for the resin.

6. A cement according to claim 1, wherein the binder contains a catalytically-effective amount of a curing agent for said resin.

7. A cement according to claim 1, wherein the binder contains a catalytically-effective amount of a non-latent curing agent for said resin.

8. A cement according to claim 1, wherein the binder contains a catalytically-effective amount of a latent curing agent for said resin.

9. A cement according to claim 1, wherein the resin has a viscosity of about 200 cps or less at 25° C.

10. A cement according to claim 1, wherein 20–100% by weight of the aggregate consists of particles smaller than 200 Tyler mesh and the balance (if any) consists of particles falling within the range of minus 48 to plus 200 Tyler mesh.

11. A kit for preparing a cement, which kit comprises the following ingredients:
   (a) an aggregate selected from the group consisting of calcined anthracite, graphite and mixtures thereof, said aggregate having a particle size of smaller than 48 Tyler mesh;
   (b) a curable water-soluble liquid polymeric resin; and
   (c) optionally a curing agent for the resin;
   at least said elements (a) and (b) being separately packaged and being present in a ratio by weight such that upon admixture with a suitable amount of water they form a cement as defined in claim 1.

12. A kit according to claim 11 wherein the curing agent is packaged separately from said aggregate and said resin.

13. A kit according to claim 12 further including a mixer suitable for mixing said ingredients.

14. A kit according to claim 10, further including instructions for mixing said ingredients together to produce said cement.

* * * * *